United States Patent [19]  [11] Patent Number: 4,759,231
Kurata et al.  [45] Date of Patent: Jul. 26, 1988

[54] STEERING WHEEL CORE STRUCTURE

[75] Inventors: Hidenori Kurata, Zama; Yoshinori Akiyama, Tokyo, both of Japan

[73] Assignee: Nissan Motor Co., Ltd., Japan

[21] Appl. No.: 938,849

[22] Filed: Dec. 8, 1986

[30] Foreign Application Priority Data

Dec. 9, 1985 [JP] Japan .................. 60-274999

[51] Int. Cl.$^4$ .............................................. B62D 1/04
[52] U.S. Cl. ........................................................ 74/552
[58] Field of Search ........................................... 74/552

[56] References Cited

U.S. PATENT DOCUMENTS

| 1,850,265 | 3/1932 | German | 74/552 |
| 3,893,349 | 7/1975 | Stent | 74/552 |
| 4,018,537 | 4/1977 | Koch et al. | 74/552 |
| 4,606,240 | 8/1986 | Sakane | 74/552 |

FOREIGN PATENT DOCUMENTS

| 173826 | 3/1986 | European Pat. Off. | 74/552 |
| 3426684 | 1/1985 | Fed. Rep. of Germany | 74/552 |
| 3400609 | 2/1985 | Fed. Rep. of Germany | 74/552 |
| 3442784 | 6/1985 | Fed. Rep. of Germany | 74/552 |
| 3535768 | 4/1986 | Fed. Rep. of Germany | 74/552 |
| 985008 | 7/1951 | France | 74/552 |
| 1151080 | 1/1958 | France | 74/552 |
| 2446211 | 9/1980 | France | 74/552 |
| 2577185 | 8/1986 | France | 74/552 |
| 318614 | 6/1934 | Italy | 74/552 |
| 83667 | 6/1980 | Japan | 74/552 |
| 29566 | 2/1984 | Japan | 74/552 |
| 100055 | 6/1984 | Japan | 74/552 |
| 100056 | 6/1984 | Japan | 74/552 |
| 102657 | 6/1984 | Japan | 74/552 |
| 120565 | 7/1984 | Japan | 74/552 |
| 184059 | 10/1984 | Japan | 74/552 |
| 192668 | 11/1984 | Japan | 74/552 |

Primary Examiner—Gary L. Smith
Assistant Examiner—Rodney M. Lindsey
Attorney, Agent, or Firm—Leydig, Voit & Mayer

[57] ABSTRACT

A steering wheel core structure comprises a hub core, polygonal in cross section with diametrically opposed, parallel peripheral faces; a spoke core with a U-shaped central portion brought into engagement with the peripheral surfaces of the hub core to clamp the same and held at the central portion between an enlarged end of the hub core and a hub bracket. The hub bracket has a finger engaged in a peripheral cut of the hub core so as to prevent relative rotation between the hub bracket and the hub core, a pair of upstanding portions engageable with upstanding portions of the spoke core so as to prevent relative rotation between the spoke core and the hub core, and a pair of horn contact portions and a pair of hub cover mounting portions cooperating to hold therebetween radial portions of the spoke core so as to prevent the spoke core from falling off from the hub bracket. The spoke core is secured at the central portion to the hub cover by projection welding and the hub bracket is secured at its base portion to the hub core by projection welding.

7 Claims, 3 Drawing Sheets

STEERING WHEEL CORE STRUCTURE

BACKGROUND OF THE INVENTION

1. Field of the Invention

The present invention relates in general to steering wheels for automotive vehicles and particularly to a core structure for reinforcement of a steering wheel.

2. Description of the Prior Art

An example of a steering wheel core structure is shown in FIGS. 6 and 7. The core structure consists of a metal hub core 105 splined to an end of a steering shaft 101 and secured thereto with a nut 103, a flange 105a integral with the hub core 105, a metal spoke core 107 secured by carbon dioxide welding A to the back face of the flange 105a and a metal hub bracket 109 secured by projection welding B to the front face of the flange 105a. With the above structure, the transfer of torque to the steering shaft 101 is performed through the spoke core 107, welded joint A and the hub core 105. The hub bracket 109 is used for installation of a horn spring, pad, etc. on the hub core 105.

The prior art steering wheel core structure requires that the carbon dioxide welding A and projection welding B be assured and reliable so that vibrations of the steering wheel will not cause breakage of the welded joint A between the spoke core 107 and the hub core 105 or the welded joint B between the hub bracket 109 and the hub core 105. For this reason, the carbon dioxide welding A and the projection welding B must be done with particular care resulting in poor work efficiency and high manufacturing cost.

Further, the prior art core structure inevitably requires the hub core 105 to have the integral flange 105a in order to make the projection welding A assured, increasing the weight of the hub core 105, which may adversely affect fuel consumption of the vehicle and cause increased vibration of the steering wheel.

SUMMARY OF THE INVENTION

In accordance with the present invention, there is provided a novel and improved steering wheel core structure which comprises a hub core for installation on an end of a steering shaft, a circular handle core, a spoke core interconnecting the handle core and the hub core and a hub bracket installed on the axial end of the hub core.

The hub core is polygonal in cross section, has a pair of diametrically opposed peripheral faces, and is formed with a peripheral cut at one end.

The spoke core includes a U-shaped portion engaging the peripheral faces of the hub core to clamp the hub core, a pair of upstanding portions extending from the central portion parallel to the axis of the steering shaft, and a pair of radial portions extending between the upstanding portions and the handle core.

The hub bracket is a single piece and includes a base portion attached to the hub core and formed with a finger engaged in the peripheral cut of the hub core so as to prevent relative rotation between the hub bracket and the hub core, means for defining spaces in which the upstanding portions of the spoke core are received and stopper means for preventing the spoke core falling off from the hub bracket through axial movement relative to the steering shaft.

The structure of the present invention is effective for overcoming the above noted disadvantages and shortcomings inherent in the prior art structure.

It is accordingly an object of the present invention to provide a novel and improved steering wheel core structure for a vehicle which can transfer torque from the steering wheel to the steering shaft even when the welded joint between the spoke core and the hub core is broken.

It is another object of the present invention to provide a novel and improved steering wheel core structure of the above described character which can simplify the welding processes for joining the spoke core to the hub core.

It is a further object of the present invention to provide a novel and improved steering wheel core structure of the above described character which can simplify the welding processes for joining the hub bracket to the hub core.

It is another object of the present invention to provide a novel and improved steering wheel core structure which can be produced with less work time and manufacturing cost.

It is a yet further object of the present invention to provide a novel and improved steering wheel core structure which is lighter in weight to improve fuel consumption of the vehicle and prevent vibration of the steering shaft.

DETAILED DESCRIPTION OF THE PREFERRED EMBODIMENT

Figure 1:
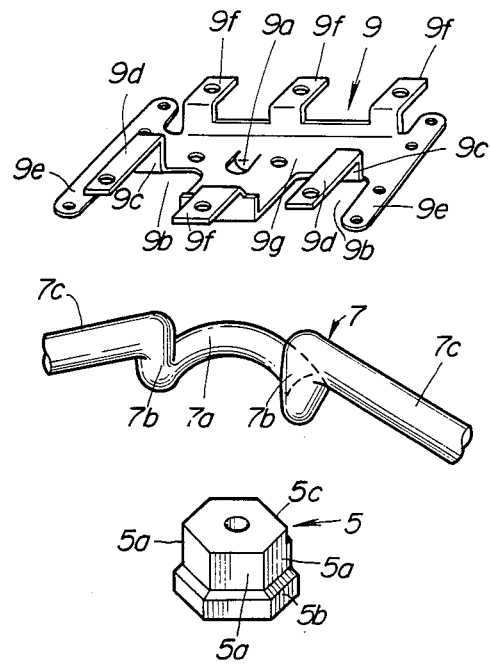
FIG. 1 is a fragmentary exploded view of a steering wheel core structure according to an embodiment of the present invention.

Referring to FIGS. 1 through 5, a steering wheel core structure of this invention consists of a hub core 5 splined to an end of a steering shaft 1 and secured thereto with a nut 3, a circular handle core 4, a spoke core 7 extending between the handle core 4 and the hub core 5 and secured to the hub core 5 with projection welding B and a hub bracket 9 secured to an axial end of the hub core 5 with projection welding B.

More specifically, the hub core 5 is polygonal in cross section, e.g. hexagonal as shown and is stepped at its outer periphery to have an enlarged end 5b while being formed with a peripheral cut 5c at an end opposite to the enlarged end 5b.

The spoke core 7 is formed from a single metal rod and includes a U-shaped central portion 7a brought into engagement with a pair of diametrically opposed, parallel peripheral faces 5a, 5a of the hub core 5 and clamping or holding the hub core 5 tightly and rigidly, a pair of upstanding portions 7b, 7b extending upwards (i.e., upstanding axially of the steering shaft 1) from the opposite axial ends of the central portion 7a and a pair of radial portions 7c, 7c extending between the upstanding portions 7b, 7b and the handle core 4. The radial portions 7c, 7c lie in a plane which is offset from the plane in which the central portion 7a lies, by the distance corresponding to the length of the upstanding portion 7b. The spoke core 7 is generally circular in cross section except for the central portion 7a which is formed into a rectangular cross section.

The hub bracket 9 is formed from a one-piece metal sheet and includes a generally rectangular, planar base portion 9g attached to the above described axial end of the hub core 5 and formed with a finger 9a brought into engagement with the peripheral cut 5 of the hub core 5, a pair of upstanding portions 9c, 9c extending upwards (i.e., upstanding axially of the steering shaft 1) from a common edge of the base portion 9g and located adjacent the respective longitudinal ends of same, a pair of elongated horn contact portions 9d extending from the upstanding portions 9c, 9c in the same direction and in parallel with the base portion 9g, and a pair of elongated hub cover mounting portions 9e, 9e provided at the respective longitudinal ends of the base portion 9g in such a manner as to lie in the same plane as the base portion 9g. The upstanding portions 9c, 9c of the hub bracket 9 are positioned in close proximity to the upstanding portions 7b, 7b of the spoke core 7 and adapted to provide the above described edge of the base portion 9g with notched portions through which the upstanding portions 7b, 7b of the spoke core 7 projects beyond the base portion 9g and also adapted to provide spaces 9b, 9b in which the upstanding portions 7b, 7b of the spoke core 7 are received. The horn contact portions 9d, 9d and the hub cover mounting portions 9e, 9e are adapted to clamp or hold therebetween the radial portions 7c, 7c of the spoke core 7 to limit movement of the spoke core 7 in the direction of removal or falling off from the hub bracket 9. The hub bracket 9 is further formed with a plurality of horn spring mounting portions 9f.

Figure 3:
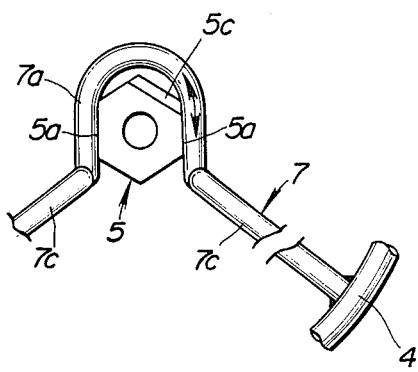
FIGS. 3 to 5 are fragmentary view of the core structure of FIG. 1 for explanation of the operation thereof.

In assembly, the spoke core 7 is secured to the hub core 5 by projection welding B, being held in a state that the central portion 7a of the spoke core 7 is put into contact with the opposed parallel faces 5a, 5a of the hub core 5 to clamp same as shown in FIG. 3. The hub bracket 9 is secured to the hub core 5 by projection welding B, being held in a state that the hub bracket 9 is engaged at the finger 9a in the peripheral cut 5c of the hub core 5 while receiving the upstanding portions 7b, 7b of the spoke core 7 in the spaces 9b, 9b and holding the radial portions 7c, 7c between the horn contact portions 9d, 9d and the hub cover mounting portions 9e, 9e. The handle core 4 is formed from a metal rod of a circular cross section and secured to the opposite axial ends of the spoke core 7 by welding in the conventional manner.

Figure 2:
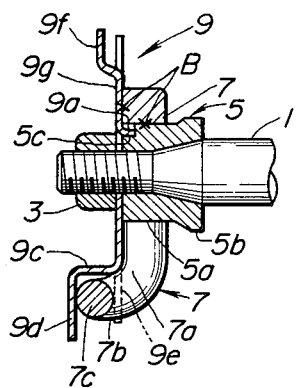
FIG. 2 is a fragmentary sectional view of the core structure of FIG. 1 in its assembled state.
Figure 4:
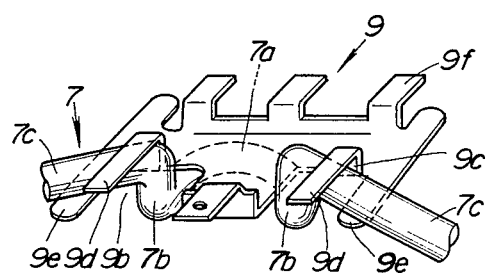
Figure 5:
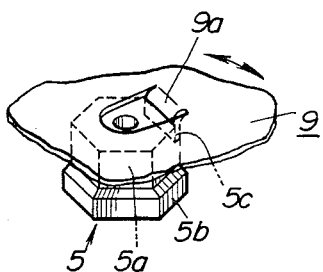
Figure 6:
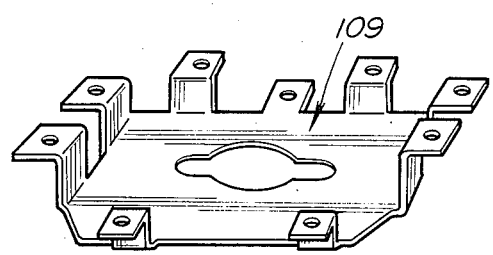
FIG. 6 is a fragmentary exploded view of a prior art steering wheel core structure.
Figure 6:
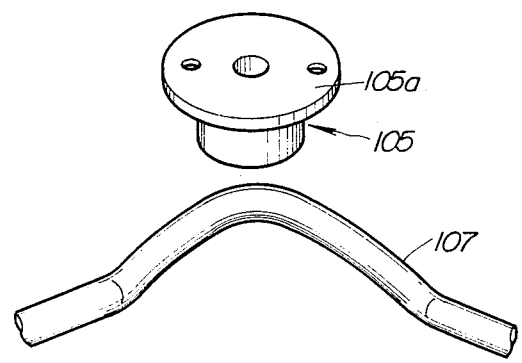
Figure 7:
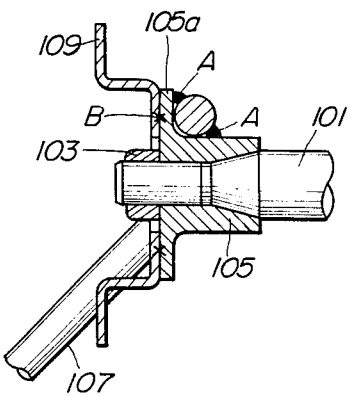
FIG. 7 is a fragmentary sectional view of the core structure of FIG. 6 in its assembled state.

In operation, when the welded joint between the hub core 5 and the spoke core 7 by projection welding B is broken, relative rotation between the hub core 5 and the spoke core 7 about the axis of the steering shaft 1 is prevented and the transfer of torque is maintained from the steering wheel to the steering shaft 1 since the U-shaped central portion 7a of the spoke core 7 is held in engagement with the opposed parallel faces 5a, 5a of the hub core 5 to clamp the same tightly and rigidly as shown in FIG. 3. In addition to this, since the upstanding portions 7b, 7b of the spoke core 7 are positioned in close proximity to the upstanding portions 9c, 9c of the hub bracket 9 and engageable with same as shown in FIG. 4, the relative rotation between the spoke core 7 and the hub core 5 about the axis of the steering shaft 1 is further prevented. On the other hand, since the spoke core 7 is held between the enlarged end of the hub core 5 and the base portion 9g of the hub bracket 9 while being held at the radial portions 7c, 7c between the horn contact portions 9d, 9d and the hub cover mounting portions 9e, 9e as shown in FIG. 2, it is assuredly prevented from falling off from the hub core 5 and the hub bracket 9 through movement axially of the steering shaft 1.

When the welded joint between the hub core 5 and the hub bracket 9 by projecting welding B is broken, the hub bracket 9 is prevented from rotation about the axis of the steering shaft 1 relative to the hub core 5 since the hub bracket 9 is engaged at the finger 9a in the peripheral cut 5c of the hub core 5. Further, since the hub bracket 9 is secured to the steering shaft 1 with the nut 3 as shown in FIG. 2, it is prevented from falling off of the hub core 5 through axial movement along the steering shaft 1.

From the foregoing, it is to be understood that even when all of the welded joints are broken, the transfer of torque from the steering wheel to the steering shaft 1 can be retained. By this, the welding processes for joining the spoke core 7 and the hub bracket 9 to the hub core 5 can be simplified resulting in a reduced working time and therefore a reduced manufacturing cost.

It is further to be understood that the hub core 5 does not require any integral flange, the manufacturing processes of the hub core 5 can be simplified and the weight of the hub core 5 can be reduced, resulting in improved fuel consumption of the vehicle in which the steering wheel core structure of this invention is utilized and making it possible to prevent vibrations of the steering shaft experienced with of the prior art structure.

What is claimed is:

1. A steering wheel core stucture for a vehicle having a steering shaft, comprising:

a hub core for installation on an end of the steering shaft and shaped to be polygonal in cross section to have a pair of diametrically opposed peripheral faces while being formed with a peripheral cut at an axial end thereof;

a circular handle core;

a spoke core interconnecting said handle core and said hub core and including a U-shaped central portion engaging said peripheral faces of said hub core to clamp said hub core, a pair of upstanding portions upstanding from the respective axial ends of said central portion axially of the steering shaft, and a pair of radial portions extending between said upstanding portions and said handle core; and a hub bracket installed on said axial end of said hub core, said hub bracket being a single piece and including a base portion attached to said axial end of said hub core and formed with a finger engaged in said peripheral cut of said hub core so as to prevent relative rotation between said hub bracket and said hub core, upstanding means for defining spaces in which said upstanding portions of said spoke core are received, and stopper means for preventing said spoke core from falling off from said hub bracket through movement axially of the steering shaft;

said hub bracket being formed from a one-piece metal sheet and said base portion of said hub bracket being generally rectangular and planar, said upstanding means comprising a pair of upstanding portions extending from a common edge of said base portion so as to provide said edge with notched portions through which said upstanding portions of said spoke core projects beyond said base portion, said upstanding portions of said hub bracket being located adjacent the longitudinal ends of said base portion, said stopper means comprising a pair of elongated horn contact portions extending from said upstanding portions of said hub bracket in the same direction and in parallel to said base portion and a pair of elongated hub cover mounting portions provided to the respective longitudinal ends of said base portion in such a manner as to lie in the same plane as said base portion so that said radial portions of said spoke core are held between said horn contact portions and said hub cover mounting portions.

2. A steering wheel core structure as set forth in claim 1 wherein said spoke core is secured at said central portion to said peripheral faces of said hub core by projection welding, and said hub bracket is secured at said base portion to said axial end of said hub core by projection welding.

3. A steering wheel core structure as set forth in claim 2 wherein said peripheral faces of said hub core are parallel to each other.

4. A steering wheel core structure as set forth in claim 3 wherein said base portion of said hub bracket is to be clamped between said axial end of said hub core and a nut when said hub bracket and said hub core are to be fastened with said nut to the steering shaft.

5. A steering wheel core structure as set forth in claim 4 wherein said spoke core is formed from a one-piece metal rod which is generally circular in cross section except for said central portion having a rectangular cross section.

6. A steering wheel core structure as set forth in claim 5 wherein said hub core is stepped at its outer periphery to have an enlarged end opposite to said end having said peripheral cut so that said central portion of said spoke core is held between said enlarged end of said hub core and said hub bracket.

7. A steering wheel core structure as set forth in claim 1 wherein said upstanding portions of said hub bracket are positioned in close proximity to said upstanding portions of said spoke core so as to prevent relative rotation between said spoke core and said hub core about the axis of the steering shaft.

* * * * *